(12) United States Patent
Ganesan et al.

(10) Patent No.: US 9,929,880 B2
(45) Date of Patent: Mar. 27, 2018

(54) SYSTEM AND METHOD FOR MANAGING VLAN ASSOCIATIONS WITH NETWORK PORTS

(71) Applicant: DELL PRODUCTS L.P., Round Rock, TX (US)

(72) Inventors: Senthil Kumar Ganesan, Fremont, CA (US); Venkatesan Mahalingam, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 211 days.

(21) Appl. No.: 14/047,329

(22) Filed: Oct. 7, 2013

(65) Prior Publication Data

US 2015/0098474 A1 Apr. 9, 2015

(51) Int. Cl.
*H04L 12/46* (2006.01)

(52) U.S. Cl.
CPC ............ *H04L 12/467* (2013.01); *Y02B 60/43* (2013.01)

(58) Field of Classification Search
None
See application file for complete search history.

(56) References Cited

U.S. PATENT DOCUMENTS

| | | | | |
|---|---|---|---|---|
| 6,035,105 A * | 3/2000 | McCloghrie | ........ | H04L 12/4645 370/351 |
| 6,151,322 A * | 11/2000 | Viswanath | .......... | G06F 13/1605 370/395.53 |
| 6,188,694 B1 * | 2/2001 | Fine et al. | ..................... | 370/402 |
| 6,430,621 B1 * | 8/2002 | Srikanth | ............. | H04L 12/4645 709/227 |
| 6,937,576 B1 * | 8/2005 | Di Benedetto et al. | ...... | 370/256 |
| RE40,999 E  * | 11/2009 | Frantz | ................. | H04L 12/4633 370/338 |
| 7,877,483 B1 * | 1/2011 | Finn | .............................. | 709/227 |
| 8,583,753 B1 * | 11/2013 | Bhagwatula | ............ | H04L 67/16 709/208 |
| 9,160,633 B1 * | 10/2015 | Ruble | ..................... | H04L 47/20 |

(Continued)

OTHER PUBLICATIONS

Brocade. ServerIron Switch and Router Guide. Switching and Routing: VLANS. Jul. 31, 2009.*

(Continued)

*Primary Examiner* — Jeffrey M Rutkowski
*Assistant Examiner* — Andre Tacdiran
(74) *Attorney, Agent, or Firm* — Haynes and Boone, LLP

(57) ABSTRACT

A system and method of managing virtual local area network (VLAN) associations with network ports includes receiving a first packet on a first port of a network switching device, extracting first VLAN identification information from the first packet, determining one or more first VLANs associated with the first port based on the first VLAN identification information, associating the first port with each of the one or more the first VLANs, and transmitting a second packet on the first port when a second VLAN associated with the second packet is included in the one or more first VLANs. In some embodiments, the first packet is received from an end station. In some embodiments, the first packet includes a VLAN identification field selected from a group consisting of a VLAN list field, a VLAN bitmap field, a Port VLAN ID type-length-value (TLV), and a Port Protocol VLAN ID TLV.

20 Claims, 4 Drawing Sheets

(56) References Cited

U.S. PATENT DOCUMENTS

| | | | |
|---|---|---|---|
| 2002/0124107 A1* | 9/2002 | Goodwin | H04L 12/24 709/242 |
| 2002/0146002 A1* | 10/2002 | Sato | 370/386 |
| 2003/0101239 A1* | 5/2003 | Ishizaki | 709/219 |
| 2003/0142685 A1* | 7/2003 | Bare | H04L 69/22 370/410 |
| 2003/0152075 A1* | 8/2003 | Hawthorne et al. | 370/389 |
| 2004/0019631 A1* | 1/2004 | Krissell et al. | 709/203 |
| 2004/0042454 A1* | 3/2004 | Zabihi | H04L 12/24 370/392 |
| 2006/0092860 A1* | 5/2006 | Higashitaniguchi | H04L 41/12 370/255 |
| 2007/0025348 A1* | 2/2007 | Nakashima | H04L 12/4641 370/389 |
| 2007/0097639 A1* | 5/2007 | de Heer et al. | 361/697 |
| 2008/0095160 A1* | 4/2008 | Yadav | H04L 12/1886 370/390 |
| 2008/0247380 A1* | 10/2008 | LaVigne | H04L 63/101 370/351 |
| 2009/0154470 A1* | 6/2009 | Kuc | 370/395.53 |
| 2009/0252170 A1* | 10/2009 | Hu | H04L 12/4675 370/395.53 |
| 2009/0262747 A1* | 10/2009 | Nakagawa | H04L 12/4641 370/412 |
| 2009/0304007 A1* | 12/2009 | Tanaka | H04L 12/4645 370/395.53 |
| 2010/0115113 A1* | 5/2010 | Short | H04L 63/08 709/228 |
| 2010/0158019 A1* | 6/2010 | Igarashi | H04L 12/4675 370/395.53 |
| 2010/0290343 A1* | 11/2010 | Tanaka | H04L 12/4645 370/235 |
| 2011/0030037 A1* | 2/2011 | Olshansky et al. | 726/4 |
| 2011/0096784 A1* | 4/2011 | Ramalingam | H04L 12/4675 370/395.53 |
| 2011/0222439 A1* | 9/2011 | Long | 370/255 |
| 2011/0305243 A1* | 12/2011 | Fan et al. | 370/392 |
| 2012/0008491 A1* | 1/2012 | Shimada | H04L 12/4633 370/218 |
| 2012/0087372 A1* | 4/2012 | Narasimhan | H04L 45/245 370/392 |
| 2013/0039218 A1* | 2/2013 | Narasimhan | H04L 49/356 370/255 |
| 2013/0329741 A1* | 12/2013 | Grosser | H04L 12/56 370/395.53 |
| 2014/0029623 A1* | 1/2014 | Hernandez | H04L 61/103 370/395.53 |
| 2015/0010003 A1* | 1/2015 | Song | H04L 12/4654 370/392 |
| 2015/0023349 A1* | 1/2015 | Wheeler | H04L 12/467 370/392 |
| 2015/0172077 A1* | 6/2015 | Yoshida | H04L 49/25 370/401 |

OTHER PUBLICATIONS

Srinivasa Manikantan. Tutorial on the Link Layer Discovery Protocol. EE Times. Feb. 1, 2005.*

* cited by examiner

SYSTEM AND METHOD FOR MANAGING VLAN ASSOCIATIONS WITH NETWORK PORTS

BACKGROUND

The present disclosure relates generally to information handling systems, and more particularly to managing virtual local area network (VLAN) associations with network ports.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Most modern networks and information handling systems are organized in a hierarchical fashion. Individual servers and end stations are typically coupled in a hub and spoke fashion to network switching devices or switches, with the end stations and switches typically being located in somewhat close proximity to each other. The switches are then in turn coupled to other switches in a hub and spoke fashion through one or more layers of switches until an edge router or gateway is encountered that couple the network of switches to other networks or wide area networks (WANs), such as the Internet. Depending on the configuration of the switches and/or the number of levels of switches in the hierarchy, the switches and their interconnections may form one or more local area network (LANs). The LANs are typically divided up geographically so that all of the end stations that are coupled to a particular switch belong to the same LAN. In order to move an end station from one LAN to another often involved moving the cable connecting the end station to the network from one switch to another.

When network function is partitionable by the physical location of the end station, this arrangement makes a lot of sense. This is, however, often not the case. In some examples, end stations from one department may be spread across several buildings where it is not practical to put duplicate switch hierarchies in place. In some examples, it may be desirable to segregate different kinds of network traffic on different LANs so that one type of network traffic (e.g., multimedia traffic) does not interfere with bandwidth needed for other types of network traffic. In some examples, the presence of mobile end stations that can move from access point to access point in different physical LANs may make the segregation of network traffic even more difficult.

Security and other concerns may also add to the difficulty. Due to the nature of network address learning and/or other protocols, switches often receive network packets on one port and flood it on the LAN by forwarding it to all the other ports on the LAN. If one department wants to prevent its network traffic from being flooded to end stations outside its department, the traditional LAN-based topology of the network is not adequate unless the LAN configuration is constrained so that the physical layout corresponds to the desired logical layout. This is often not very practical.

One potential solution for addressing some of the limitations of physical LANs is to divide the networks into virtual LANs (VLANs). In VLANs, network traffic is often tagged with a VLAN identifier (ID) field that indicates which VLAN the network traffic belongs to. The switches can control the ports on which to forward the network traffic by forwarding the network traffic only to those ports that are associated with the VLAN ID. This allows the network architect to organize VLANs across the switch hierarchy that may be independent of the physical location and connections between the switches. As long as at least one network path belonging to a particular VLAN exists between each pair of end stations associated with that VLAN, network traffic with the corresponding VLAN ID may move across the network. In some cases, it is often desirable to assign end stations and network links to multiple VLANs. This flexibility, however, comes with a price, as the management of VLAN associations and assignments in the overlapping VLANs may become quite complex.

Accordingly, it would be desirable to provide improved systems and methods for managing VLANs, including the learning of VLANs associated with network ports.

SUMMARY

According to one embodiment, a method of managing VLAN associations with a first port on a network switching device includes receiving a first packet on the first port, extracting first VLAN identification information from the first packet, determining one or more first VLANs associated with the first port based on the first VLAN identification information, associating the first port with each of the one or more the first VLANs, and transmitting a second packet on the first port when a second VLAN associated with the second packet is included in the one or more first VLANs.

According to another embodiment, a network switching device includes one or more processors, a memory coupled to the one or more processors, and a port coupled to the one or more processors and configured to couple the network switching device to an end station. The control unit is configured to receive a first packet from the port, extract VLAN identification information from the first packet, determine one or more first VLANs associated with the first port based on the VLAN identification information, associate the port with each of the one or more first VLANs, and transmit a second packet on the port when a second VLAN associated with the second packet is included in the one or more first VLANs.

According to yet another embodiment, an information handling system includes a switch. The switch includes one or more processors, a memory coupled to the one or more processors, and a network port coupled to the one or more processors and configured to couple the network switching device to an end station. The information handling system further includes one or more data structures stored in the memory for recording associations between network ports and VLANs. Each of the one or more first data structures is indexed by at least one of network port identifiers and VLAN identifiers. The control unit is configured to receive a first message from the end station on the network port, parse the first message to determine one or more VLAN identifiers, determine one or more first VLANs associated with the first port based on the one or more VLAN identifiers, associate the network port with each of the one or more first VLANs by updating the one or more first data structures, and transmit a second message on the network port when a second VLAN associated with the second message is included in the one or more first VLANs.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
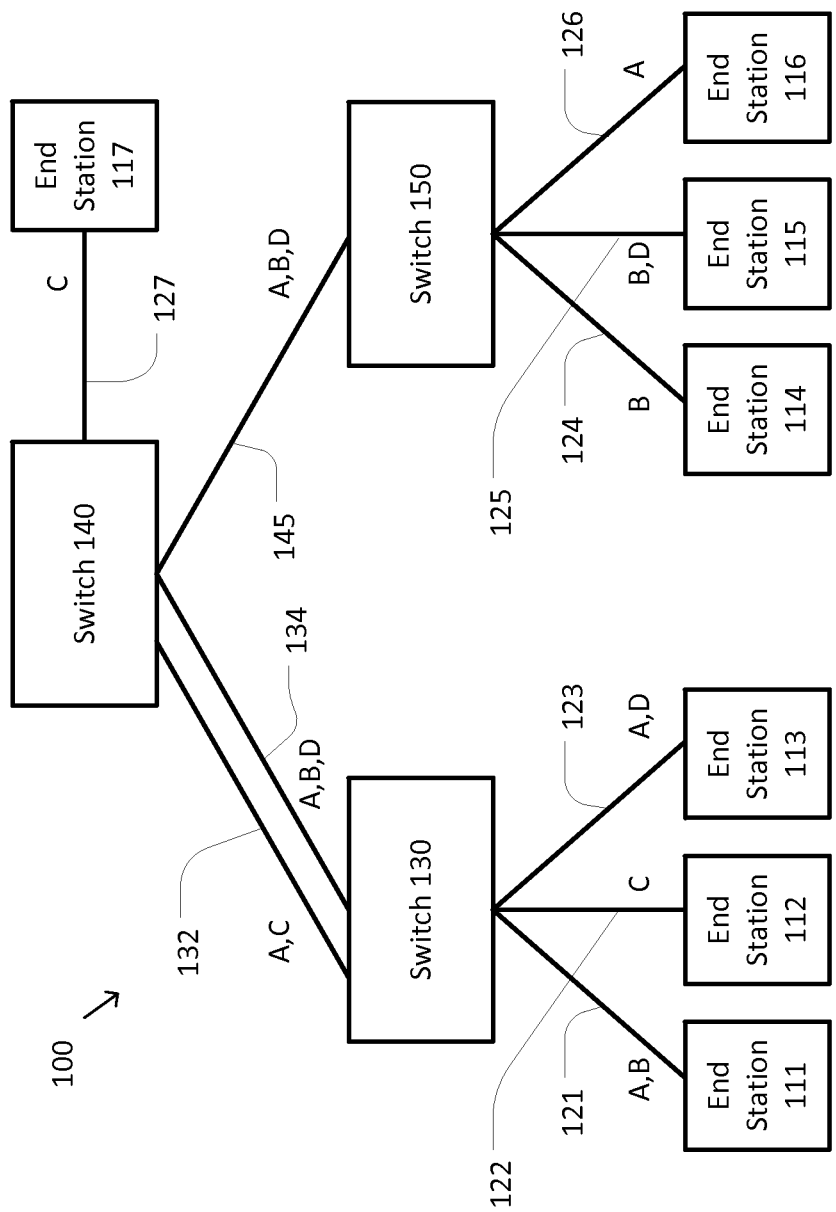
FIG. 1 is a simplified diagram of a networked environment according to some embodiments.

FIG. 1 is a simplified diagram of a networked environment 100 according to some embodiments. As shown in FIG. 1, networked environment 100 includes end stations 111-117 and network switching devices or switches 130, 140, and 150 variously coupled together using network links 121-127, 132, 134, and 145. And although FIG. 1 shows only seven end stations 111-117, three switches 130, 140, and 150, and ten network links 121-127, 132, 134, and 145 in networked environment 100, it is understood that networked environment 100 may include any number of end stations, switches, and network links. In some examples, each of the end stations 111-117 may be any kind of network device from which network traffic may originate or terminate, including servers, PCs, end user devices, and/or the like.

The end stations 111-117 and the switches 130, 140, and 150 of networked environment 100 depict one possible configuration for a hierarchical switching network. As shown in FIG. 1, switch 130 is coupled to end stations 111-113 using network links 121-123, respectively. Similarly, switch 150 is coupled to end stations 114-116 using network links 124-126, respectively. And, end station 117 is coupled to switch 140 using network link 127. Additionally, switch 130 is coupled to switch 140 using network links 132 and 134 and switch 150 is coupled to switch 140 using network link 145. Depending upon how the switches 130, 140, and/or 150 are provisioned and/or configured, networked environment 100 may include one or more LANs based on the physical topology between the end stations 111-117 and the switches 130, 140, and 150. In some examples, switch 130 may create a first LAN for end stations 111-113, switch 150 may create a second LAN for end stations 114-116, and switch 140 may create a third LAN for end station 117 and switches 130 and 150. In some examples, all of the end stations 111-117 and switches 130, 140, and 150 may be included in the same LAN. The physical arrangement of network 100 demonstrates the potential difficulties of partitioning network traffic based on the physical topology. In some examples, when switch 130 treats end stations 111-113 as belonging to the same LAN, traffic received by switch 130 via network link 132 may be flooded to all three of the end stations 111-113 and possibly even flooded back to switch 140 on network link 134, even though that may not be particularly desirable. In some examples, when all of the end stations 111-117 and switches 130, 140, and 150 belong to the same LAN, network traffic may eventually get flooded to each of the end stations 111-117 and switches 130, 140, and 150.

To address this issue, networked environment 100 further includes several VLANs designated using the letters A-D. Although four VLANs designated A-D are shown in networked environment 100, it is understood that any number or configuration of VLANs is possible in networked environment 100 and that the configuration of FIG. 1 is representative of but one possible configuration. As shown, end stations 111, 113, and 116 are associated with VLAN A along with network links 121, 123, 132, 134, 145, and 126. These associations are noted by the letter "A" designations next to the respective network links. This arrangement means that any network traffic that includes the VLAN ID associated with VLAN A may be flooded along network links 121, 123, 132, 134, 145, and 126 to end stations 111, 113, and 116 and switches 130, 140, and 150, but would not be flooded to end stations 112, 114, 115, or 117. Similarly, end stations 111, 114, and 115 are associated with VLAN B along with network links 121, 134, 145, 124, and 125, end stations 112 and 117 are associated with VLAN C along with network links 122, 132, and 127, and end stations 113 and 115 are associated with VLAN D along with 123, 134, 145, and 125. The use of VLANs in networked environment 100 also demonstrates other advantages in the use of VLANs. First, the end stations in networked environment 100 may be divided based on criteria other than the switch they are physically coupled to. Second, the end stations may each be associated with more than one VLAN when desired by the network administrator. Third, different types of network traffic may be segregated using the VLANs to provide greater management and control. For example, network traffic on VLAN C would not be forwarded to switch 150 and network traffic on VLAN C would be separated from network traffic on VLANs B and D as the network traffic moves between switches 130 and 140.

Provisioning and/or configuration of the VLANs in networked environment 100 is important to proper network function. Failure to properly provision and/or configure the VLANs may result in various network failures and/or undesirable behavior. In some examples, if network link 132 is not properly associated with VLAN C, end stations 112 and 117 may become isolated from each other and exchange of network traffic between them may be blocked. In some examples, if switch 140 considers network link 145 to be assigned to VLAN A and switch 150 does not, network traffic for end station 116 that includes a VLAN ID corresponding to VLAN A may be dropped by switch 150 without being forwarded to end station 116. In some examples, if network link 145 becomes associated with VLAN C, network traffic for VLAN C may be flooded to switch 150 even though no end stations associated with VLAN C are coupled to switch 150. This may result in consuming unnecessary bandwidth on network link 145 and/or consuming unnecessary processing and/or other resources on switch 150.

As discussed above and further emphasized here, FIG. 1 is merely an example which should not unduly limit the scope of the claims. One of ordinary skill in the art would recognize many variations, alternatives, and modifications. In some embodiments, networked environment 100 may include parallelization not expressly shown in FIG. 1. In some examples, the connections between the end stations 111-117 and the switches 130, 140, and/or 150 or between the switches 130, 140, and 150 may include multiple parallel network links beyond those shown as network links 132 and 134. In some examples, the multiple parallel network links may be associated with corresponding link aggregation groups (LAGs). In some examples, any of the switches 130, 140, and/or 150 may be implemented using virtual link trunking (VLT) pairs, stacked switches, and/or other multi-switch arrangements with shared management. In some embodiments, one or more of the switches 130, 140, and/or 150 may support routing and/or other networking services such as those provided by Dynamic Host Configuration Protocol (DHCP) servers, Address Resolution Protocol (ARP) servers, and/or the like. In some embodiments, networked environment 100 may further include one or more bridges coupling together corresponding VLAN segments. In some embodiments, one or more of the end stations may not be associated with any VLAN. Network traffic transmitted by those unassociated end stations is referred to as untagged network traffic and it would be forwarded by a switch on network links associated with a VLAN ID assigned to untagged network traffic.

Several protocols exist for managing VLAN routes and associations between and among switches in a network. These protocols include the Multiple VLAN Registration Protocol (MVRP) of the IEEE 802.1Q standard and the Generic Attribute Registration Protocol (GARP) VLAN Registration Protocol extension to the IEEE 802.1D standard. Both MVRP and GVRP provide mechanisms for switches to exchange information regarding the VLANs of the various end stations coupled to them and to determine network paths between and through the switches so that end stations associated with the same VLANs could exchange network traffic using the network of switches. MVRP and/or GARP, however, are not typically installed on end stations. In some examples, MVRP and/or GARP may not be available on an end station because the end station may not be VLAN aware and generates untagged network traffic. In some examples, MVRP and/or GARP may not be available on an end station because the quantity and/or size of network traffic associated with MVRP and/or GVRP may be too resource intensive for use by the end station. In some examples, MVRP and/or GVRP may exchange large packets of information as often as every 200 ms.

Managing the assignment and/or association of VLANs between end stations and switches typically uses other mechanisms. In many cases the VLAN associations are provisioned manually. A network administrator manually provisions the VLAN assignments for each of the network ports on the end station and each of the corresponding ports on the switch. Once manually provisioned, the end station and the switch may exchange informational messages about the VLAN associations using a management protocol, such as the Link Layer Discovery Protocol (LLDP) of the IEEE 802.1ab standard. While suitable for informational purposes, the existing mechanisms of LLDP may not be very suitable for automated discovery and learning of VLAN associations.

The LLDP includes several optional type-length-value (TLV) fields that may be added to the periodically exchanged LLDP management packets or protocol data units (PDUs). And while some of these optional TLVs may include VLAN identifying information, they are not generally suitable for the discovery and learning of the VLAN associations. These optional TLVs include the Port VLAN ID TLV, the Port Protocol VLAN ID TLV, and the VLAN Name TLV.

The Port VLAN ID TLV and the Port Protocol VLAN ID TLV are used to identify the VLAN ID to be used for untagged network traffic. These are more typically exchanged between switches so that the switches may agree on the VLAN ID that should be added to an untagged network packet when it is forwarded over a network link supporting VLANs. This allows the forwarded network packet to include a VLAN header and/or a VLAN ID field. Because the Port VLAN ID and Port Protocol VLAN ID TLVs provide information on VLAN associations for untagged network packets, they are not very suitable for discovery and learning of VLANs associated with tagged network traffic.

The VLAN Name TLV is better suited for allowing an end station to share a VLAN ID associated with one of its network ports. The value subfield of the VLAN Name TLV may include up to 41 bytes/octets designating a single VLAN name. This is typically used to associate a name with a corresponding VLAN ID. And while the VLAN Name TLV may be suitable for sharing information on a single VLAN, it is not very practical for use on ports and network links associated with multiple VLANs because a separate VLAN Name TLV would be used for each VLAN associated with the respective port and network link. Because the IEEE 802.1 standard supports up to 4094 VLANs per port and network link, the inclusion of up to that many VLAN Name TLVs in each LLDP PDU may be prohibitive.

Accordingly, more efficient and/or effective mechanisms for the exchange of VLAN associations are desirable.

Figure 2:
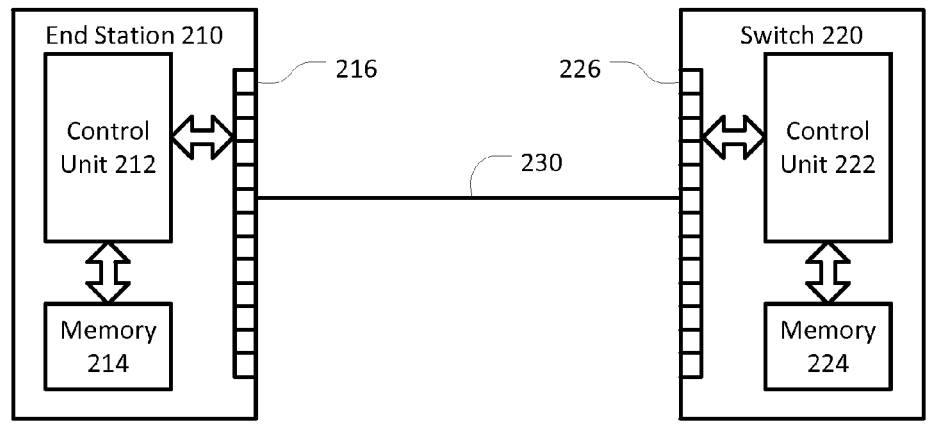
FIG. 2 is a simplified diagram of end station and switch interconnectivity according to some embodiments.

FIG. 2 is a simplified diagram of end station and switch interconnectivity according to some embodiments. As shown in FIG. 2, an end station 210 is coupled to a switch 220 using a network link 230. In some examples, end station 210 may be any of the end stations 111-117, switch 220 may be any of the switches 130, 140, and/or 150, and network link 230 may be any of the network links 121-127.

End station 210 includes a control unit 212 and memory 214. Control unit 212 is coupled to memory 214 and may control the operation of end station 210. In some examples, control unit 212 may include one or more processors that may be any type of central processing unit, microprocessor, microcontroller, multi-core processor, and/or the like. End station 210 further includes one or more network ports 216 coupled to control unit 212 and configured to couple end station 210 to at least one other network device using a network link. As shown in FIG. 2, one of the network ports 216 of end station 210 is coupled to switch 220 using network link 230. Although not shown in FIG. 2, other of the one or more network ports 216 may be used to further couple end station 210 to switch 220 or to other switches.

Memory 214 may be used to store various software components that may be executed by control unit 212. Memory 214 may further store variables and/or data structures being manipulated by the software components. Memory 214 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Switch 220 includes a control unit 222 and memory 224. Control unit 222 is coupled to memory 224 and may control the operation of switch 220. In some examples, control unit 222 may be used to make forwarding decisions for network traffic being handled by switch 220. In some examples, control unit 222 may include one or more processors that may be any type of central processing unit, microprocessor, microcontroller, multi-core processor, and/or the like. Switch 220 further includes one or more network ports 226 coupled to control unit 222 and configured to couple switch 220 to other switches and/or network devices, such as end stations, using network links. Control unit 222 may use one or more protocols to communicate with the other switches and network devices using the network ports 226 and network links. As shown in FIG. 2, one of the network ports 226 of switch 220 is coupled to one of the network ports 216 of end station 210 using network link 230. Although not shown in FIG. 2, other of the one or more network ports 226 may be used to further couple switch 220 to end station 210 and/or to other switches and/or end stations.

Figure 3A:
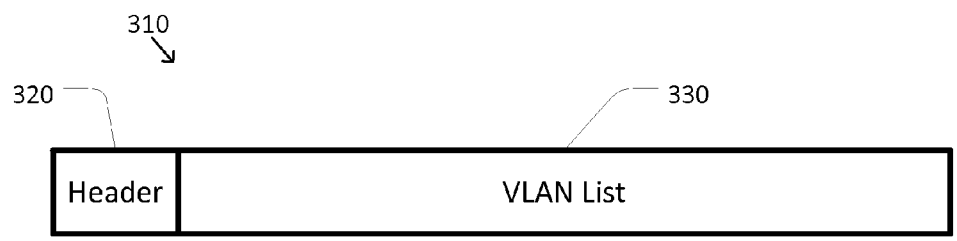
FIGS. 3A and 3B are simplified diagrams of VLAN identification fields according to some embodiments.
Figure 3B:
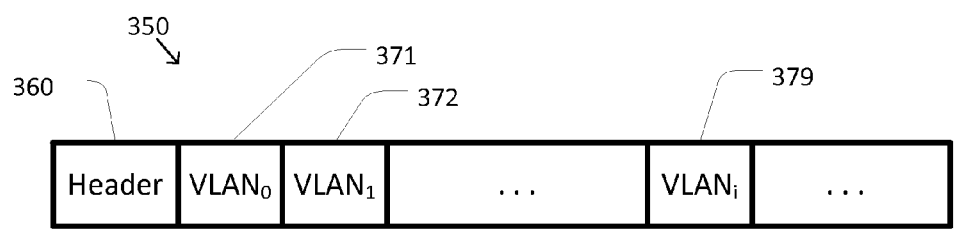

FIGS. 3A and 3B are simplified diagrams of VLAN identification fields according to some embodiments. As shown in FIG. 3A, a VLAN List field 310 includes a header 320 and a payload including a VLAN list 330. Header 320 may include one or more fields that may be used to identify VLAN List field 310 as a VLAN List field and/or to distinguish VLAN List field 310 from other fields and/or packets that may be transmitted or received. The VLAN list 330 may include a delimiter-separated list of VLAN IDs associated with the network link and corresponding network ports on which the VLAN List field 310 may be transmitted and/or received. In some examples, the delimiter may include a comma "," and/or a comma and white space. In some examples, the VLAN IDs may include individual numeric VLAN IDs and/or ranges of numeric VLAN IDs separated by hyphens "-". As some examples, the VLAN list 330 may include any of the following: "4", "1,2,3", "3-7", or "3, 5-8, 11, 13-19".

As shown in FIG. 3B, a VLAN Bitmap field 350 includes a header 360 and a payload including a series of bits $VLAN_0$ 371, $VLAN_1$ 372, ..., $VLAN_i$ 379, Header 360 may include one or more fields that may be used to identify VLAN Bitmap field 350 as a VLAN Bitmap field and/or to distinguish VLAN Bitmap field 350 from other fields and/or packets that may be transmitted or received. Each of the VLAN bits 371-379 indicates whether the network link and corresponding network ports on which the VLAN Bitmap field 350 is transmitted and/or received is associated with the respective VLAN. In some examples, association with the respective VLAN may be indicated with a logic 1 value and non-association with a logic 0 value. In some examples, the logic 0 value may indicate association and the logic 1 valued may indicate non-association. In some examples, when the logic 1 value indicates association, a VLAN bit pattern of "001100010 . . . " may indicate association with the VLANs with IDs 2, 3, and 7 as the $VLAN_2$, $VLAN_3$, and $VLAN_7$ bits each have the logic 1 value.

In some embodiments, the VLAN List field 310 and/or the VLAN Bitmap field 350 may be transmitted as management packets on a network link between an end unit, such as any of the end units 111-117 and/or 210, and a switch, such as any of the switches 130, 140, 150, and/or 220. In some embodiments, the VLAN List field 310 and/or the VLAN Bitmap field 350 may be included as a header, a field, and/or a TLV in another packet transmitted on the network link. In some examples, the another packet may be a LLDP PDU.

Figure 4:
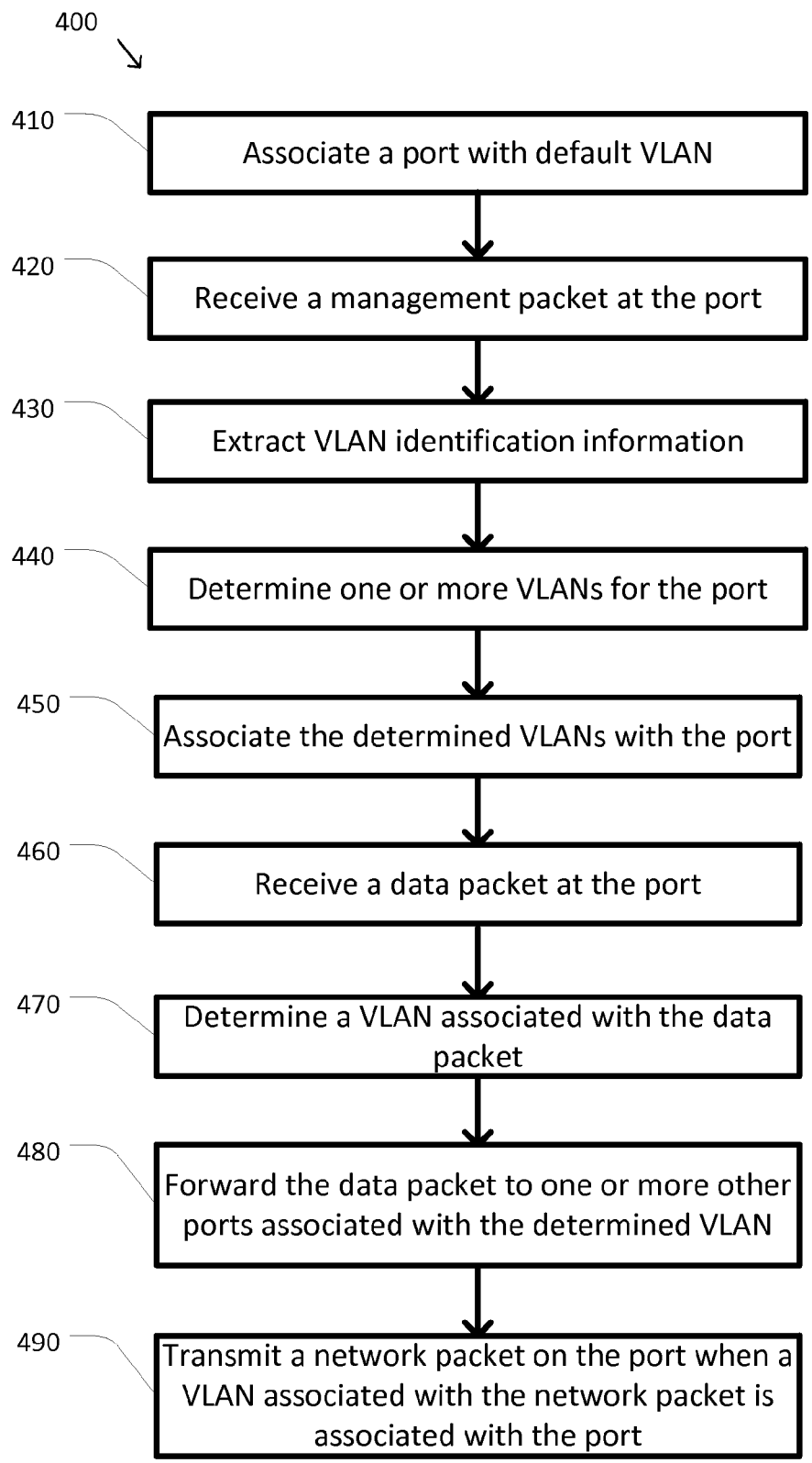
FIG. 4 is a simplified diagram of a method of VLAN learning on a port of a switch according to some embodiments.

FIG. 4 is a simplified diagram of a method 400 of VLAN learning on a port of a switch according to some embodiments. In some embodiments, one or more of the processes 410-490 of method 400 may be implemented, at least in part, in the form of executable code stored on non-transient, tangible, machine readable media that when run by one or more processors (e.g., the one or more processors of control unit 222) may cause the one or more processors to perform one or more of the processes 410-490. In some embodiments, method 400 may be performed in a switch, such as any of the switches 130, 140, 150, and/or 220 for each of the one or more ports, such as network ports 226, on the switch.

At a process 410, a port is associated with a default VLAN. Before a switch receives any VLAN identification information on a port, the switch may assign the VLAN to the default VLAN. This permits the switch to forward and/or flood network packets received on the port to other ports in the default VLAN even though no information is yet known about the VLANs the port is to be associated with. It also permits the switch to forward and/or flood packets on the port that are associated with the default VLAN. In some examples, the default VLAN may be assigned a VLAN ID of 1.

At a process 420, a management packet is received at the port. In some examples, the management packet may be a network message including VLAN identification information. In some examples, the VLAN identification information may include VLAN IDs for each of the VLANs the port, and the network link coupled to the port, the port should be associated with. In some examples, the VLAN identification information may include a VLAN List field, such as the VLAN List field 310, a VLAN Bitmap field, such as the VLAN Bitmap field 350, a Port VLAN ID TLV, and/or a Port Protocol VLAN ID TLV. In some examples, the management packet may be an LLDP PDU with the VLAN identification information being included in an optional TLV. In some examples, the management packet may be received periodically on the port. In some examples, the management packet may be transmitted by an end unit, such as any of the end units 111-117 and/or 210.

At a process 430, the VLAN identification information is extracted. The VLAN identification information is extracted from the management packet received during process 420. In some examples, extracting the VLAN identification information may include parsing the management packet and identifying a header in the management packet corresponding to a VLAN identification field, such as the header 320 and/or the header 360, and extracting the corresponding payload. In some examples, the VLAN identification information may include more than one VLAN identification field.

Figure 5:
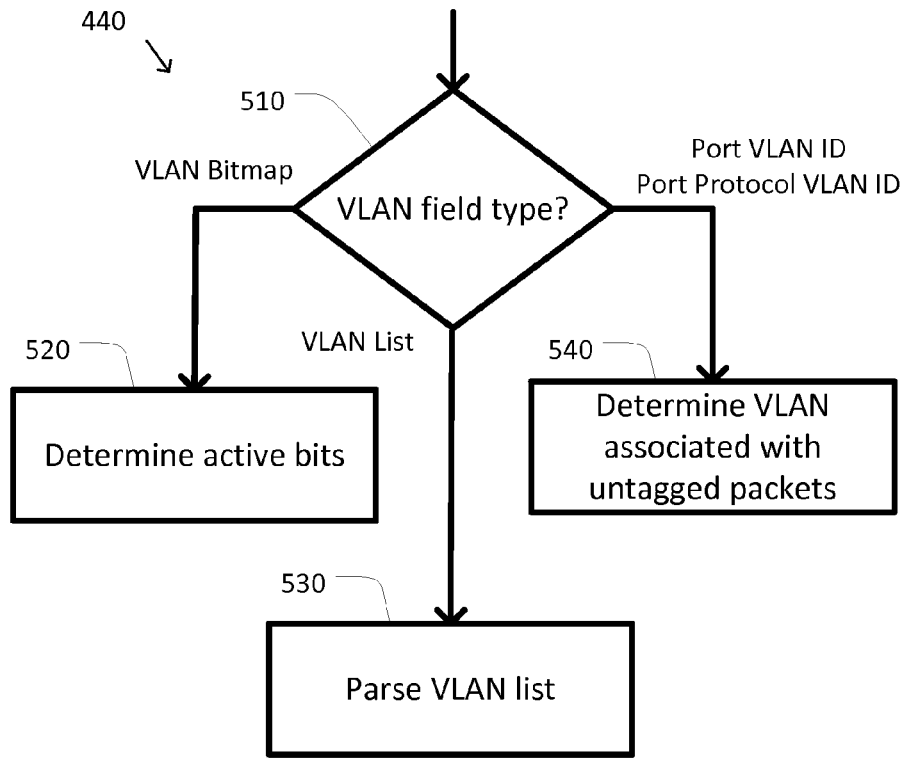
FIG. 5 is a simplified diagram of a process for determining one or more VLANs for the port according to some embodiments.

At a process 440, one or more VLANs for the port are determined. Based on the VLAN identification information extracted during process 430, the VLANs for the port are determined. FIG. 5 is a simplified diagram of process 440 for determining one or more VLANs for the port according to some embodiments. In some embodiments, one or more of the processes 510-540 of process 440 may be implemented, at least in part, in the form of executable code stored on non-transient, tangible, machine readable media that when run by one or more processors (e.g., the one or more processors of control unit 222) may cause the one or more processors to perform one or more of the processes 510-540. In some examples, when the management packet received during process 420 includes multiple VLAN identification fields, the processes 510-540 may be performed on each of the VLAN identification fields.

At a process 510, a type of the VLAN identification field is determined. In some examples, the type of the VLAN identification field may be included in a header included in the VLAN identification field. In some examples, the header may be the same header used to extract the VLAN information during process 430. When the type indicates that VLAN identification field is a VLAN Bitmap field, the VLAN Bitmap field is processed using a process 520. When the type indicates that the VLAN identification field is a VLAN List field, the VLAN List field is parsed using a process 530. When the type indicates that the VLAN identification field is a Port VLAN ID TLV and/or a Port Protocol VLAN ID TLV, the TLV is processed using a process 540.

At the process 520, active bits are determined. Each of the bits in the VLAN Bitmap field are examined to determine which VLAN bits are active and thus indicate that the corresponding VLAN is associated with the port on which the VLAN Bitmap field is received. In some examples, when the VLAN Bitmap field is consistent with the VLAN Bitmap field 350, the VLAN bits $VLAN_0$ 371, $VLAN_1$ 372, . . . $VLAN_i$ 379, . . . are extracted and used to determine the VLAN associations. For example, when the logic 1 value indicates association, a VLAN bit pattern of "001100010 . . . " in the VLAN Bitmap field may indicate that the determined VLANs are the VLANs associated with IDs of 2, 3, and 7 as the $VLAN_2$, $VLAN_3$, and $VLAN_7$ bits each have the logic 1 value. Once the active bits of the VLAN Bitmap field are determined, the port is associated with the determined VLANs.

At the process 530, the VLAN list is parsed. The delimiter separated list of VLANs included in the VLAN List field may be parsed to determine the VLANs to be associated with the port. In some examples, when the VLAN List field is consistent with the VLAN List field 310, the VLAN list 330 is parsed to determine the VLAN associations. For example, when the VLAN list is "1, 2, 3", the VLANs associated with VLAN IDs 1, 2, and 3 are the determined VLANs. Similarly, when the VLAN list is "2-5", the VLANs associated with VLAN IDs 2, 3 4, and 5 are the determined VLANs. As another example, when the VLAN list is "2-4, 7, 9-12", the VLANs associated with VLAN IDs 2, 3 4, 7, 9, 10, 11, and 12 are the determined VLANs. Once the VLAN list is parsed, the port is associated with the determined VLANs.

At the process 540, the VLAN associated with untagged packets is determined. The Port VLAN ID TLV and/or the Port Protocol VLAN ID TLV may be parsed to determine the VLAN ID to be used for untagged network traffic. In some examples, the Port VLAN ID TLV and/or the Port Protocol VLAN ID TLV may be received from another switch rather than an end station. Once the VLAN ID to be used for untagged network traffic is determined, the port may be associated with that VLAN ID.

Referring back to FIG. 4, at the process 450, the determined VLANs are associated with the port. Once the VLANs to be associated with the port are determined during processes 440, 510, 520, and/or 530, the switch may associate them with the port. In some examples, the switch may record the VLAN associations for the port in a suitable data structure and/or database. In some examples, the data structure and/or database may be indexed so that the VLANs associated with the port may be determined from an identifier associated with the port, e.g., a port number. In some examples, the data structure and/or database may be indexed so that each of the ports associated with a particular VLAN ID may be determined. In some examples, the recording of the associations during process 450 may replace any previous VLAN associations for the port. By replacing any previous VLAN associations, the VLAN identification information received during process 420 may be used to remove VLAN associations as well as add them. When the received VLAN identification information omits a previously communicated VLAN association, that VLAN association for the port is effectively removed.

At the process 460, a data packet is received at the port. As part of its general operation, the switch may receive incoming data packets at the port. As the switch receives each of the packets it processes them to determine whether they should be forwarded and/or flooded. In some examples, the decision to flood the packet may depend on previously learned and/or recorded address information recorded in one or more forwarding data structures maintained by the switch.

At, a process 470, a VLAN associated with the data packet is determined. The data packet received during process 460 may be parsed to determine whether it is tagged with a VLAN ID. When the data packet includes the VLAN ID, the VLAN ID determines the VLAN associated with the data packet. When the data packet is untagged and does not include a VLAN ID and no VLAN has otherwise been associated with untagged network traffic using process 540, the default VLAN ID associated with the port during process 410 is determines the VLAN associated with the data packet. When the data packet is untagged and does not include a VLAN ID and a VLAN has been associated with untagged network traffic using process 540, the VLAN associated with untagged network traffic determines the VLAN associated with the data packet.

At a process 480, the data packet is forwarded to one or more other ports associated with the determined VLAN. In some examples, the data structures and/or databases maintained during process 450 may be used to identify one or more other ports associated with the VLAN determined during process 470. In some examples, when the switch decides to forward the data packet based on addressing information included in the data packet, the switch may forward the packet based on information in its forwarding data structures and the one or more other ports associated with the determined VLAN. In some examples when the switch decides to flood the data packet on the determined VLAN, the switch may forward the data packet on each of the one or more other ports of the switch associated with the determined VLAN except for the port on which the data packet was received during process 460. In some examples, the switch may flood a different packet, such as an address query packet, on the one or more other ports associated with the determined VLAN in order to determine an appropriate port on which to forward the data packet.

At a process 490, a network packet is transmitted on the port when a VLAN associated with the network packet is associated with the port. As a counterpart to processes 460-480, the port may also be used to transmit and/or forward network packets on behalf of the switch and/or the other ports of the switch. In some examples, the network packet may be received on one of the other ports of the switch using the process 460 for the other port. When the processes 470 and 480 for the other port determine that the network packet is associated with a VLAN that is also associated with the port, the other port may have the network packet forwarded and/or flooded on the port. Thus, each of the ports of the switch may forward and/or flood network packets on behalf of other ports of the switch when the VLAN associated with a respective one of the network packets is also associated with the port on which the respective network packet is forwarded and/or flooded. In some examples, the data structures and/or databases maintained during process 450 may be used to determine when the port is associated with the VLAN associated with the network packet.

The method 400 may continue by repeating one or more of the processes 420-490. In some examples, the switch may wait for another management packet to be received on the port using process 420. In some examples, the switch may wait for another data packet to be received on the port using process 460. In some examples, the switch may transmit another network packet on the port using process 490.

Figure 6:
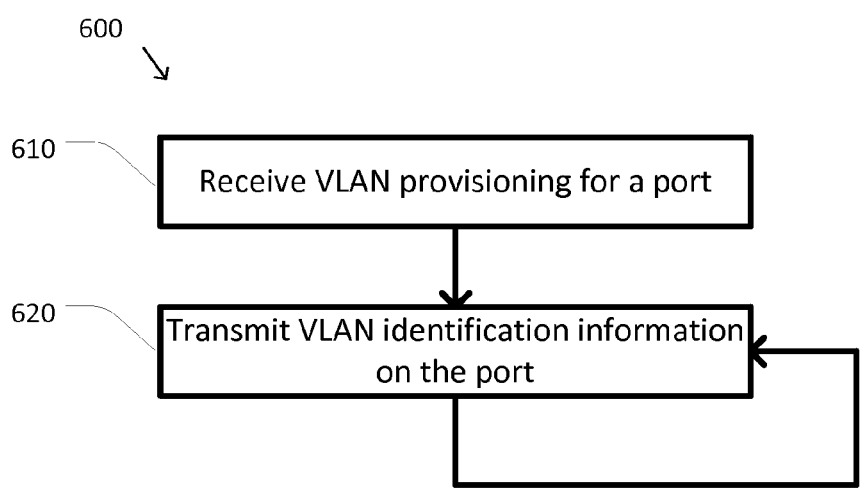
FIG. 6 is a simplified diagram of a method of VLAN advertising on a port of an end station according to some embodiments.

FIG. 6 is a simplified diagram of a method 600 of VLAN advertising on a port of an end station according to some embodiments. In some embodiments, one or more of the processes 610-620 of method 600 may be implemented, at least in part, in the form of executable code stored on non-transient, tangible, machine readable media that when run by one or more processors (e.g., the one or more processors of control unit 212) may cause the one or more processors to perform one or more of the processes 610-620. In some embodiments, method 600 may be performed in an end station that is VLAN aware, such as any of the end stations 111-117 and/or 210 for each of the one or more ports, such as network ports 216, on the end station.

At a process 610, VLAN provisioning for a port is received. During the provisioning and/or configuration of an end station the VLAN associations for each of the ports of the end station are determined. In some examples, the VLAN associations may be received via configuration commands received from a network administrator. In some examples, the VLAN associations may be received as part of an automated or semi-automated network configuration received from a configuration server. In some examples, the configuration server may be a DHCP and/or an ARP server. In some examples, the VLAN associations may be received from a configuration file and/or a configuration data structure stored in the memory of the end station.

At a process 620, VLAN identification information is transmitted on the port. VLAN identification information including the VLAN associations received for the port during process 610 are periodically transmitted on the port. In some examples, the VLAN identification information may include one or more VLAN identification fields. In some examples, each of the VLAN identification fields may include a VLAN List field 310, a VLAN Bitmap field 350, and/or the like. In some examples, the VLAN identification information may be transmitted in a stand-alone packet or as part of another packet transmitted on the port. In some examples, the VLAN identification information may be included in a LLDP PDU as an optional TLV. In some examples, the VLAN identification information may be transmitted to a switch that receives the VLAN identification information using its corresponding process 420.

As discussed above and further emphasized here, FIGS. 4 and 6 are merely examples which should not unduly limit the scope of the claims. One of ordinary skill in the art would recognize many variations, alternatives, and modifications. In some embodiments, the transmission of VLAN identification information by the end station using process 620 and the reception and processing of that VLAN identification information by the switch using processes 420-450 may include one or more acknowledgement and/or confirmation processes. In some examples, the switch may return the VLAN identification information to the end station using one or more VLAN identification fields to acknowledge and/or confirm the receipt of that VLAN identification information. In some examples, the switch may periodically transmit VLAN identification information associated with the port to the end station so that the end station may confirm that the switch and the end station are in agreement as to the VLANs associated with the network link between them. In some examples, when the switch and the end station do not agree on the VLAN associations, one or more error messages may be exchanged. In some embodiments, the VLAN identification information may be exchanged between the end station and the switch using packets other than management packets. In some examples, the VLAN identification information may be transmitted piggyback style in the data packets received during process 460. In some embodiments, when ports are combined using link aggregation groups (LAGs), methods 400 and/or 600 may be performed for each of the LAGs rather than for the individual ports that are combined to form the LAGs.

Some embodiments of the switches 130, 140, 150, and/or 220 may include non-transient, tangible, machine readable media that include executable code that when run by one or more processors may cause the one or more processors (e.g., the one or more processors of control unit 222) to perform the processes of method 400 as described above. Some embodiments of the end stations 111-117 and/or 210 may include non-transient, tangible, machine readable media that include executable code that when run by one or more processors may cause the one or more processors (e.g., the one or more processors of control unit 212) to perform the processes of method 600 as described above. Some common forms of machine readable media that may include the processes of methods 400 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing virtual local area network (VLAN) associations on a network switching device, the method comprising:
   receiving a first packet on a first port of the network switching device from an end station, the first port coupling the network switching device to the end station via a one-hop network link;
   determining that a type of a VLAN identification field in the first packet is a VLAN bitmap, the VLAN bitmap including bits, each bit being associated with a respective IEEE 802.1 VLAN and designating whether the network link belongs or does not belong to that respective IEEE 802.1 VLAN;
   extracting identification of each of the IEEE 802.1 VLANs to which the network link belongs by determining a subset of the bits designating the IEEE 802.1 VLANs to which the network link belongs;
   associating the first port and each of the IEEE 802.1 VLANs to which the network link belongs in response to the extracting;
   receiving a second packet on a second port of the network switching device;
   extracting a first VLAN identifier from the second packet; and
   forwarding the second packet on the first port in response to determining that the first VLAN identifier is associated with the first port.

2. The method of claim 1, further comprising associating the first port with a default VLAN before receiving the first packet.

3. The method of claim 1, further comprising:
   determining whether the second packet is an untagged packet; and
   in response to the second packet being an untagged packet, determining that a VLAN identified by the first VLAN identifier is a designated VLAN for untagged packets.

4. The method of claim 1 wherein determining the type of the VLAN identification field comprises:
   parsing the first packet; and
   identifying a header corresponding to the VLAN identification field.

5. The method of claim 1, further comprising:
   receiving a third packet comprising a Port VLAN ID TLV or a Port Protocol VLAN ID TLV; and
   examining the Port VLAN ID TLV or the Port Protocol VLAN ID TLV to determine a designated VLAN for untagged packets.

6. The method of claim 1 wherein the first packet is a Link Layer Discovery Protocol (LLDP) protocol data unit.

7. The method of claim 1, further comprising transmitting a third packet on the first port back to the end station, the third packet including the identification of each of the IEEE 802.1 VLANs to which the network link belongs.

8. The method of claim 1 wherein associating the first port and each of the IEEE 802.1 VLANs to which the network link belongs comprises replacing all prior VLAN associations for the first port.

9. The method of claim 1 wherein associating the first port and each of the IEEE 802.1 VLANs to which the network link belongs comprises storing the associations in one or more data structures that are indexed by port identifiers.

10. The method of claim 1 wherein associating the first port and each of the IEEE 802.1 VLANs to which the network link belongs comprises storing the associations in one or more data structures that are each indexed by VLAN identifiers.

11. A network switching device comprising:
    one or more processors;
    a memory coupled to the one or more processors; and
    a plurality of ports;
    wherein the network switching device is configured to:
       receive a first packet on a first port of the plurality of ports, the first port coupling the network switching device to an end station via a one-hop network link;
       determine that a type of a VLAN identification field in the first packet is a VLAN bitmap, the VLAN bitmap including bits, each bit being associated with a respective IEEE 802.1 VLAN and designating whether the network link belongs or does not belong to that respective IEEE 802.1 VLAN;
       extract identification of each of the IEEE 802.1 VLANs to which the network link belongs by determining a subset of the bits designating the IEEE 802.1 VLANs to which the network link belongs;
       associate the first port and each of the IEEE 802.1 VLANs to which the network link belongs in response to the extracting;
       receive a second packet on a second port of the plurality of ports;
       extract a first VLAN identifier from the second packet; and
       forward the second packet on the first port in response to determining that the first VLAN identifier is associated with the first port.

12. The network switching device of claim 11 wherein the first packet is a Link Layer Discovery Protocol (LLDP) protocol data unit.

13. The network switching device of claim 11 wherein the network switching device is further configured to transmit a third packet on the first port back to the end station, the third packet including the identification of each of the IEEE 802.1 VLANs to which the network link belongs.

14. The network switching device of claim 11 wherein associating the first port and each of the IEEE 802.1 VLANs to which the network link belongs comprises storing the associations in one or more data structures that are each indexed by port identifiers.

15. The network switching device of claim 11 wherein the network switching device is further configured to:
   determine whether the second packet is an untagged packet; and
   in response to the second packet being an untagged packet, determine that a VLAN identified by the first VLAN identifier is a designated VLAN for untagged packets.

16. An information handling system comprising:
   a switch comprising one or more processors, a memory coupled to the one or more processors, and a plurality of network ports coupled to the one or more processors and at least a first one of the plurality of network ports configured to couple the switch to an end station via a one-hop network link; and
   one or more data structures stored in the memory for recording associations between the plurality of network ports and virtual local area networks (VLANs), each of the one or more data structures being indexed by network port identifiers;
   wherein the switch is configured to:
      receive a first message from the end station on the first one of the plurality of network ports;
      determine that a type of a VLAN identification field in the first message is a VLAN bitmap, the VLAN bitmap including bits, each bit being associated with a respective IEEE 802.1 VLAN and designating whether the first one of the plurality of network ports belongs or does not belong to that respective IEEE 802.1 VLAN;
      extract identification of each of the IEEE 802.1 VLANs to which the first one of the plurality of network ports belongs by determining a subset of the bits designating the IEEE 802.1 VLANs to which the first one of the network ports belongs;
      associate the first one of the plurality of network ports and each of the IEEE 802.1 VLANs to which the first one of the plurality of network ports belongs in response to the extracting by updating the one or more data structures;
      receive a second message on a second one of the plurality of network ports;
      extract a first VLAN identifier from the second message; and
      forward the second message on the first one of the plurality of network ports in response to determining that the first VLAN identifier is associated with the first one of the plurality of network ports.

17. The information handling system of claim 16 wherein the first message is a Link Layer Discovery Protocol (LLDP) protocol data unit.

18. The information handling system of claim 16 wherein the switch is further configured to transmit a third packet on the first one of the plurality of network ports back to the end station, the third packet including the identification of each of the IEEE 802.1 VLANs to which the first one of the plurality of network ports belongs.

19. The information handling system of claim 16 wherein the one or more data structures are further indexed by port identifiers.

20. The information handling system of claim 16 wherein the switch is further configured to:
   determine whether the second message is an untagged packet; and
   in response to the second message being an untagged message, determine that a VLAN identified by the first VLAN identifier is a designated VLAN for untagged message.

* * * * *